March 10, 1964 R. L. GIVEN ETAL 3,124,701
FOURLAYER DIODE TRANSMISSION GATE
Filed July 23, 1959
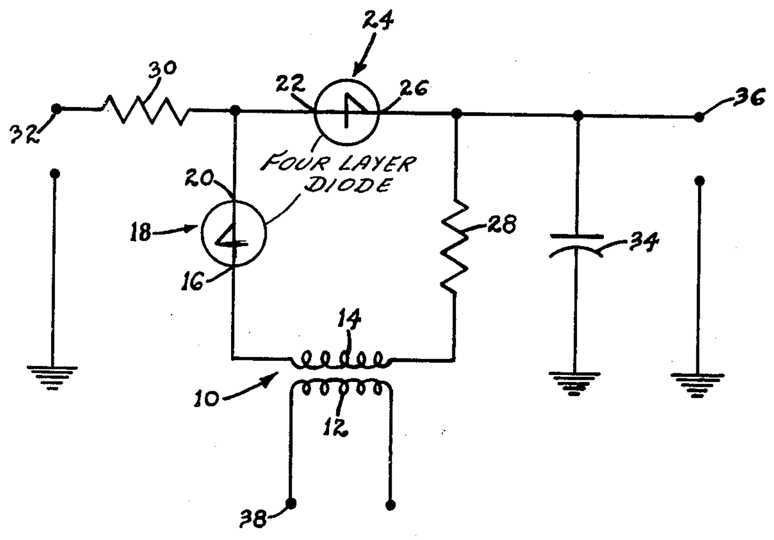
INVENTORS
RICHARD L. GIVEN
RICHARD C. NYDER
BY RICHARD C. LEE
Lawrence S. Epstein
ATTORNEYS 3,124,701
Patented Mar. 10, 1964

3,124,701

FOUR LAYER DIODE TRANSMISSION GATE

Richard L. Given, El Paso, Tex., Richard G. Nyder, Glenview, Ill., and Richard C. Lee, Allston, Mass., assignors, by mesne assignments, to the United States of America as represented by the Secretary of the Navy Filed July 23, 1959, Ser. No. 829,164
5 Claims. (Cl. 307—88.5)

This invention relates generally to gating circuits and more particularly to sample and hold gates.

In a sample and hold gate, the output voltage assumes a steady value during the enable interval. This value is held during the disable interval, until the arrival of a next enabling pulse, at which time the output voltage assumes a new value, corresponding to the new value of the input voltage. The storage device most commonly employed in such a circuit is a capacitor. The requirements of the sample and hold gate then is such that the impedance seen by the capacitor in the disable state is extremely high to prevent any appreciable discharge of the capacitor during the hold portion of the cycle. It is also necessary that the transmission impedance in the enabled state be sufficiently low so that the capacitor may be charged to the output voltage in as short a time as possible. With regard to these specific requirements, the prior art is greatly lacking.

In the sample and hold gate circuit which has been invented, four-layer diodes are utilized. The four-layer diode volt-ampere characteristics are such that a negative resistance region is bounded by two stable states: a high conductance region and a high impedance region, which according to published characteristics corresponds to impedances of ten to thirty ohms and ten to 100 megohms respectively.

A principle object of the instant invention is to provide a high speed high performance sample and hold gate.

Another object of the instant invention is to provide a gate circuit having extremely low impedance during an enabled period and extremely high impedance during a disabled period.

Still another object of the instant invention is to provide a sample and hold gate utilizing four-layer diodes.

Still another object of the instant invention is to provide an inexpensive high performance sample and hold gate circuit.

Other objects and many of the attendant advantages of this invention will be readily appreciated as the same becomes better understood by reference to the following detailed description when considered in connection with the accompanying drawings wherein:

The figure depicts the preferred schematical arrangement of the instant invention.

Referring to the figure, the sample and hold gate is shown. A pulse transformer 10 having a primary 12 and a secondary 14 is utilized in this preferred form of the invention. The transformer secondary 14 is, in this form of the invention, connected to the cathode 16 of a four-layer diode 18. The plate 20 of diode 18 is then coupled to the plate 22 of a second four-layer diode 24. The cathode 26 of four-layer diode 24 is coupled through the resistor 28 to the other end of the pulse transformer secondary 14. A series input resistor 30 is coupled to the plate of diode 24 and cathode of diode 18 and also to an input connection 32. In this form of the invention a storage device is utilized and is a capacitor 34. This capacitor 34 is connected to the cathode 26 of four-layer diode 24. An output connection is also coupled to the junction of capacitor 34 and diode cathode 26.

In operation, the invention functions as follows: When a negative going pulse is applied to terminal 38 of the transformer primary 12, the diodes 18 and 24 are converted from a high to a low impedance condition if the voltage appearing across the secondary 14 of the pulse transformer exceeds their breakdown voltage. With the diodes in the conducting state, a potential appearing at the input terminal 32 will be gated onto the capacitor 34 regardless of whether this change involves either charging or discharging the capacitor. After the voltage on the capacitor has settled out to a steady-state value, the removal of the negative potential from terminal 38 renders both diodes 18 and 24 non-conductive, since the current through them falls below the minimum value necessary to hold them in the conducting states. This is to say, each of the diodes reverts to a high impedance condition. With the diodes in this state, the capacitor 34 is prevented from discharging back through the gate circuit and into the input source, consequently the voltage placed on the capacitor during the enabled period is retained during the disabled period.

What is claimed is:

1. A gate circuit comprising a transformer having a primary input winding and also having a secondary output winding, a first diode means and a second diode means, each of said first and second diode means having plate and cathode elements, the plate element of said first diode means being directly connected to the cathode element of said second diode means and each of said other diode elements being connected to an opposing end of said secondary output winding of said transformer, variable signal input means coupled to the plate element of said first diode means and signal output means directly coupled to the cathode element of said first diode means, wherein each of said diodes is a four-layer diode.

2. The structure of claim 1 wherein said transformer is a pulse transformer.

3. The structure of claim 2 including storage means coupled to said output means.

4. The structure of claim 3 wherein said storage means is a capacitor.

5. A sample and hold circuit comprising input means for inserting input voltages into the circuit, output means for holding the sample input voltages, a diode gate means coupled in series between the input and output means which when enabled provides a low impedance path between said input and output means and when disabled provides a high impedance path between said input and output means, a diode switching means coupled in series with said diode gating means to enable and disable said diode gating means whereby the diode may be disabled to permit the input voltages to be stored in the output means and may be disabled to prevent leakage of the stored voltage, said output means including a capacitor in series with said diode gating means and said input means, said diode gating means being a four-layer diode and said diode switching means being a four-layer diode, a pulse transformer and resistor in series with said first mentioned four-layer diodes, said input means including a resistor coupled in series with said four-layer diodes.

(References on following page)

References Cited in the file of this patent

UNITED STATES PATENTS

| | | |
|---|---|---|
| 1,907,279 | Blimberg | May 2, 1933 |
| 2,403,053 | Conklin | July 2, 1946 |
| 2,581,273 | Miller | Jan. 1, 1952 |
| 2,659,815 | Curtis | Nov. 17, 1953 |
| 2,740,888 | Zukin | Apr. 3, 1956 |
| 2,808,474 | Maynard et al. | Oct. 1, 1957 |
| 2,843,765 | Aigarain | July 15, 1958 |
| 2,959,691 | Zoerner et al. | Nov. 8, 1960 |
| 2,965,771 | Finkel | Dec. 20, 1960 |
| 3,077,544 | Connelly | Feb. 12, 1963 |

OTHER REFERENCES

Sperry Engineering Review, March 1959, vol. 12, No. 1, page 36, FIG. 9.